United States Patent
Boenisch et al.

(10) Patent No.: US 9,424,102 B2
(45) Date of Patent: Aug. 23, 2016

(54) TASK GROUPING BY CONTEXT

(71) Applicant: International Business Machines Corporation, Armonk, NY (US)

(72) Inventors: Volker M. Boenisch, Boeblingen (DE); Reinhard Buendgen, Tuebingen (DE); Franziska Geisert, Altdorf (DE); Jakob C. Lang, Altdorf (DE); Mareike Lattermann, Stuttgart (DE); Angel Nunez Mencias, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 14/277,382

(22) Filed: May 14, 2014

(65) Prior Publication Data
US 2015/0331717 A1 Nov. 19, 2015

(51) Int. Cl.
G06F 9/46 (2006.01)
G06F 9/52 (2006.01)
G06F 9/48 (2006.01)
G06F 9/50 (2006.01)

(52) U.S. Cl.
CPC . *G06F 9/52* (2013.01); *G06F 9/48* (2013.01); *G06F 9/4881* (2013.01); *G06F 9/50* (2013.01); *G06F 9/5011* (2013.01)

(58) Field of Classification Search
None
See application file for complete search history.

(56) References Cited

U.S. PATENT DOCUMENTS

| | | | | | |
|---|---|---|---|---|---|
| 5,448,735 | A | * | 9/1995 | Anderson | G06F 9/4881 718/100 |
| 6,951,019 | B1 | * | 9/2005 | Anderson | G06F 9/4825 718/102 |
| 7,080,104 | B2 | * | 7/2006 | Ring | G06F 17/30575 |
| 7,174,551 | B2 | * | 2/2007 | Bakow | G06F 9/5038 718/100 |
| 7,451,201 | B2 | * | 11/2008 | Alex | H04L 41/0893 709/223 |
| 7,467,383 | B2 | * | 12/2008 | Inchingolo | G06F 9/4881 718/102 |

(Continued)

FOREIGN PATENT DOCUMENTS

WO 2013100902 A1 7/2013

OTHER PUBLICATIONS

Mishra et al. "Multitask Learning with Feature Selection for Groups of Related Tasks", 2013 IEEE, pp. 1157-1162.*

(Continued)

*Primary Examiner* — Van Nguyen
(74) *Attorney, Agent, or Firm* — Maeve Carpenter (57) ABSTRACT

In an approach to grouping tasks initialized by a first user, one or more computer processors receive a first task initialization by a first user. The one or more computer processors determine whether one or more additional tasks contained in one or more task groups are in use by the first user. Responsive to determining one or more additional tasks contained in one or more task groups are in use, the one or more computer processors determine whether the first task is related to at least one task of the one or more additional tasks. Responsive to determining the first task is related to at least one task of the one or more additional tasks, the one or more computer processors add the first task to the task group containing the at least one related task of the one or more additional tasks.

11 Claims, 5 Drawing Sheets

(56) References Cited

U.S. PATENT DOCUMENTS

| | | | | |
|---|---|---|---|---|
| 7,689,921 | B2* | 3/2010 | Rajarajan | G06F 9/4443 715/744 |
| 7,805,727 | B2* | 9/2010 | Anderson | G06F 9/4825 718/100 |
| 8,108,206 | B2 | 1/2012 | Hufnagel et al. | |
| 8,117,621 | B2* | 2/2012 | Singh | G06F 9/4881 718/100 |
| 8,146,104 | B2 | 3/2012 | Chakra et al. | |
| 8,219,432 | B1* | 7/2012 | Bradley | G06Q 10/06311 705/7.13 |
| 8,369,493 | B2 | 2/2013 | Gustafson | |
| 8,495,651 | B2* | 7/2013 | Kanai | G06F 9/45537 718/107 |
| 8,639,552 | B1* | 1/2014 | Chen | G06F 9/4881 705/7.21 |
| 8,706,858 | B2* | 4/2014 | Sadasivan | H04L 12/24 709/219 |
| 8,813,073 | B2* | 8/2014 | Kwon | G06F 8/451 718/1 |
| 8,892,702 | B2* | 11/2014 | Alex | G06Q 10/10 709/223 |
| 2003/0037091 | A1* | 2/2003 | Nishimura | G06F 9/4881 718/103 |
| 2004/0230685 | A1 | 11/2004 | Seligmann | |
| 2005/0149376 | A1* | 7/2005 | Guyan | G06Q 10/06311 705/4 |
| 2005/0183086 | A1* | 8/2005 | Abe | G06F 9/4881 718/100 |
| 2008/0082651 | A1 | 4/2008 | Singh et al. | |
| 2008/0294615 | A1* | 11/2008 | Furuya | G06F 17/3046 |
| 2009/0138504 | A1 | 5/2009 | Gile et al. | |
| 2009/0288086 | A1* | 11/2009 | Ringseth | G06F 9/4881 718/102 |
| 2012/0159507 | A1* | 6/2012 | Kwon | G06F 9/5088 718/104 |
| 2013/0346992 | A1* | 12/2013 | Sonoyama | G06F 9/46 718/102 |
| 2015/0143378 | A1* | 5/2015 | Lee | G06F 9/4843 718/103 |

OTHER PUBLICATIONS

Liang et al. "Related task scheduling research based on virtual clusters and partition of task", 2009 IEEE, pp. 131-136.*

"Be More Productive with Toodledo—An Incredibly Powerful To-Do List", Toodled, downloaded Jul. 10, 2013, <www.toodledo.com>.

"Mac Basics: The Dock", Copyright 2014 Apple, Inc., <http://support.apple.com/kb/ht2474>.

"Say hello to your new teammate", Wunderlist, downloaded Jul. 10, 2013, <https://www.wunderlist.com/en/pro#assign-todos>.

Stephenson, "My favourite KDE 4.2 Feature: Task Bar and Window Grouping", Jan. 27, 2009, <http://blogs.kde.org/2009/01/27/my-favourite-kde-42-feature-task-bar-and-window-grouping>.

"Task-focused interface", Wikipedia, the free encyclopedia, last modified Dec. 31, 2013, <http://en.wikipedia.org/wiki/Task-focused_interface>.

"The best way to manage your tasks. Never forget the milk (or anything else) again", Copyright 2014 Remember the Milk, <http://www.rememberthemilk.com/>.

"The PlasmaTask Manager", Plasma/Tasks—KDE UserBase Wiki, last modified Jun. 8, 2011, <http://userbase.kde.org/Plasma/Tasks>.

"Windows Taskbar", Copyright 2014 Microsoft, <http://windows.microsoft.com/en-us/windows7/products/features/windows-taskbar>.

"Yahoo! acquires Astrid", Copyright 2013 Todoroo, Inc., <http://astrid.com/>.

U.S. Appl. No. 14/930,741, filed Nov. 3, 2015.

List of IBM Patents or Patent Applications Treated as Related (Appendix P), filed herewith.

* cited by examiner

TASK GROUPING BY CONTEXT

FIELD OF THE INVENTION

The present invention relates generally to the field of computer task management, and more particularly to grouping related tasks.

BACKGROUND

Computing equipment, particularly Personal Computers (PC's), are being provided with increasing multitasking capabilities, whereby multiple applications can be opened at the same time, and applications in the background can continue to run as processor time is available. Applications have taken advantage of this multitasking capability by introducing multitasking models. Applications are utilizing the tabs method to create user friendly multitasking while having the user stay within one application. Whether the application is a web browser, a word processing application, or an email application, users can navigate through a number of instances within each application and a number of different applications, all of which may be open at the same time on a single computer.

A task-focused interface is a type of user interface which extends the desktop metaphor of the graphical user interface to make tasks, not files and folders, the primary unit of interaction. Instead of showing entire hierarchies of information, such as a tree of documents, a task-focused interface shows the subset of the tree that is relevant to the task-at-hand. This addresses the problem of information overload when dealing with large hierarchies, such as those in software systems or large sets of documents.

SUMMARY

Embodiments of the present invention disclose a method, computer program product, and system for grouping tasks initialized by a first user. One or more computer processors receive a first task initialization by a first user. The one or more computer processors determine whether one or more additional tasks contained in one or more task groups are in use by the first user. Responsive to determining one or more additional tasks contained in one or more task groups are in use, the one or more computer processors determine whether the first task is related to at least one task of the one or more additional tasks. Responsive to determining the first task is related to at least one task of the one or more additional tasks, the one or more computer processors add the first task to the task group containing the at least one related task of the one or more additional tasks.

DETAILED DESCRIPTION

In a fast-changing and developing world, computer-based jobs often come with a very diverse work portfolio. Therefore there is a high risk of interrupts and context switches throughout a work day. There exist different types of taskbars in various operating systems, but, in general, taskbars only list the number and type of open applications and processes. There are other tools for "Getting Things Done" (GTD), which help track items on a "to do" list, however the GTD tools generally do not aid the user by showing how tasks are related.

Embodiments of the present invention recognize that efficiency can be gained by implementing a tool that groups tasks which belong to a common work assignment. Implementation of embodiments of the invention may take a variety of forms, and exemplary implementation details are discussed subsequently with reference to the Figures.

Figure 1:
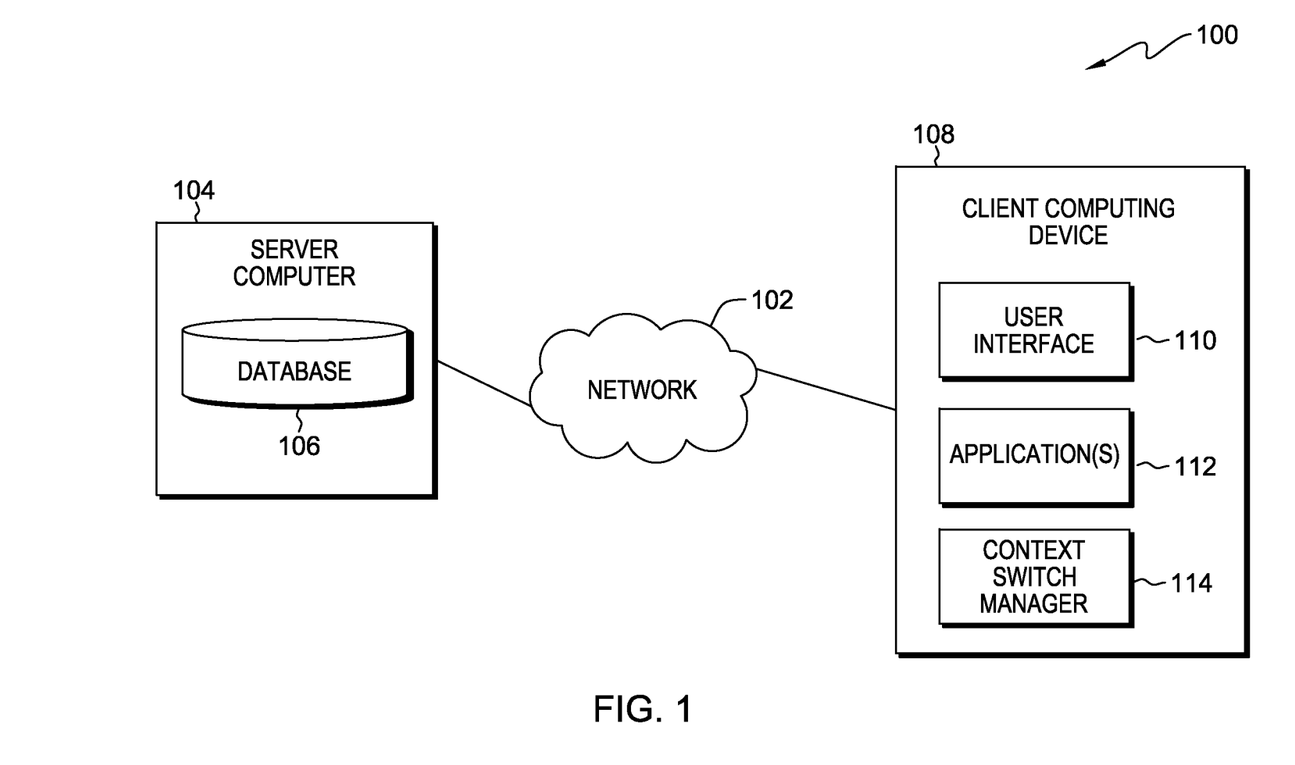
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and client computing device 108, interconnected over network 102. Network 102 can be, for example, a local area network (LAN), a wide area network (WAN), such as the Internet, or a combination of the two, and can include wired, wireless, or fiber optic connections. In general, network 102 can be any combination of connections and protocols that will support communications between server computer 104 and client computing device 108.

Server computer 104 may be a management server, a web server, or any other electronic device or computing system capable of receiving and sending data. In other embodiments, server computer 104 may represent a server computing system utilizing multiple computers as a server system, such as in a cloud computing environment. In another embodiment, server computer 104 may be a laptop computer, a tablet computer, a netbook computer, a personal computer (PC), a desktop computer, a personal digital assistant (PDA), a smart phone, or any programmable electronic device capable of communicating with client computing device 108 via network 102. In another embodiment, server computer 104 represents a computing system utilizing clustered computers and components to act as a single pool of seamless resources. Server computer 104 includes database 106.

Database 106 resides on server computer 104. In another embodiment, database 106 may reside on client computing device 108, or on another device or component within distributed data processing environment 100 accessible via network 102. A database is an organized collection of data. Database 106 can be implemented with any type of storage device capable of storing data that may be accessed and utilized by server computer 104, such as a database server, a hard disk drive, or a flash memory. In other embodiments, database 106 can represent multiple storage devices within server computer 104. Information stored on database 106 may include directories for data and documents used by client computing device 108, via network 102. The directories and data stored on database 106 may be accessed by users of other client computing devices in distributed data processing environment 100 (not shown).

Client computing device 108 may be a desktop computer, a laptop computer, a tablet computer, a specialized computer server, a smart phone, or any programmable electronic device capable of communicating with server computer 104 via network 102 and with various components and devices within distributed data processing environment 100. In general, client computing device 108 represents any programmable electronic device or combination of programmable electronic devices capable of executing machine-readable program instructions and communicating with other computing devices via a network, such as network 102. Client computing device 108 includes user interface 110, application(s) 112, and context switch manager 114. Client computing device 108 may include internal and external hardware components, as depicted and described in further detail with respect to FIG. 5.

User interface 110 is a program that provides an interface between a user of client computing device 108 and context switch manager 114. User interface 110 may also provide an interface between context switch manager 114 and database 106 on server computer 104, via network 102. A user interface, such as user interface 110, refers to the information (such as graphic, text, and sound) a program presents to a user and the control sequences the user employs to control the program. There are many known types of user interfaces. In one embodiment, user interface 110 is a graphical user interface (GUI). A GUI is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements.

Application(s) 112 are one or more of a plurality of programs that a user of client computing device 108 may access to perform tasks included in work assignments. Examples of application(s) 112 include, but are not limited to, an email application, a web browser, a word processing program, a spreadsheet program, a presentation program, etc. In one embodiment, application(s) 112 reside on client computing device 108. In another embodiment, one or more of application(s) 112 may reside on server computer 104, or other computing devices in data processing environment 100, provided the other computing devices can communicate with client computing device 108 via network 102.

Context switch manager 114 is a tool for grouping related tasks which belong to a common work assignment into task groups based on context, instead of a user having to declare that tasks are related. Tasks are special, interactive processes or threads that represent work units that belong to a work assignment. In general, a task may be a window of an application, a tab within a window, or a process that has a user interface. Context switch manager 114 supports scheduling decisions in environments where a user runs multiple tasks, and only one of the user's tasks is in focus at a particular point in time. A task is in focus when the user initializes the task. Also, a particular task is in focus while the user is actively utilizing that particular task. Context switch manager 114 tracks open tasks and applications through events, interruptions, and context switches to keep related tasks, and associated "to dos", organized for a user. Context switch manager 114 assigns tasks to groups based on a pre-defined set of rules. Context switch manager 114 may display the related tasks as groups in a tray for a user to easily review what tasks are open and switch from one work assignment to another. Context switch manager 114 is depicted and described in further detail with respect to FIG. 2.

Figure 2:
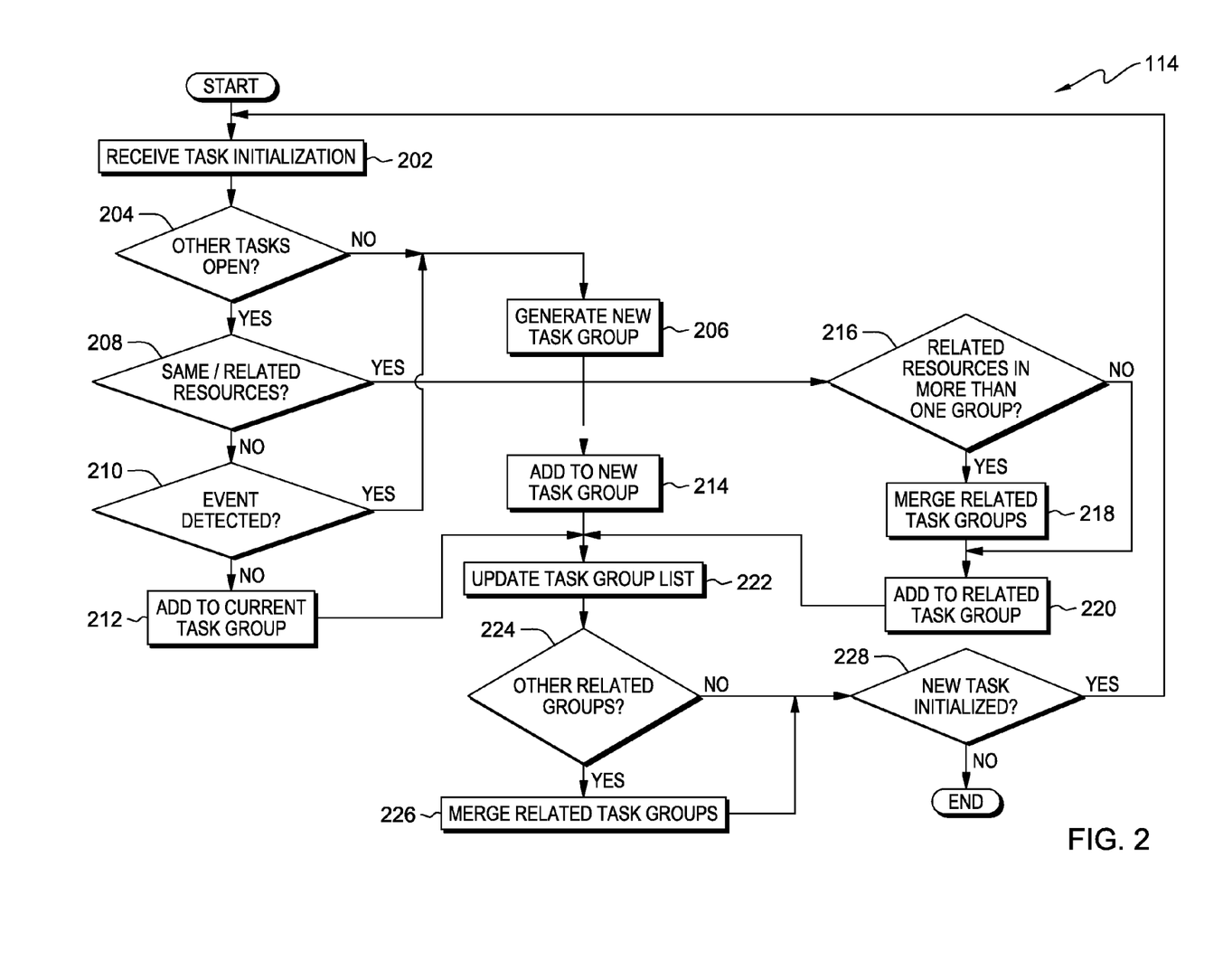
FIG. 2 is a flowchart depicting operational steps of a context switch manager, on a client computing device within the distributed data processing environment of FIG. 1, for grouping related tasks, in accordance with an embodiment of the present invention.

FIG. 2 is a flowchart depicting operational steps of context switch manager 114, on client computing device 108 within data processing environment 100 of FIG. 1, for grouping related tasks, in accordance with an embodiment of the present invention.

Context switch manager 114 receives a task initialization (step 202). A task may be initialized by opening application(s) 112. A task may also be initialized by batch processing in the background or network activity that leads to tasks being opened. As a user of client computing device 108 initializes a task, context switch manager 114 detects the new task. As discussed earlier, a task may be a window of an application, such as application(s) 112. For example, the user may open a file in a word processing program. The file is considered a task that is part of a work assignment. Another example of a task initialization is the launching of a web browser to a particular website. The initialized task is now the task in focus.

Context switch manager 114 determines whether other tasks are open (decision block 204). In order to determine whether to group tasks, context switch manager 114 first determines whether other open tasks and task groups exist. If no other tasks are open (no branch, decision block 204), then context switch manager 114 generates a new task group (step 206).

If context switch manager 114 determines that one or more tasks are open (yes branch, decision block 204), then context switch manager 114 determines whether the resource used by the newly initialized task is the same or related to the resource of a task in an existing task group (decision block 208). Resources may include files, folders, directories, network ports, semaphores, sockets, pipes, etc. Resources may also include tags, for example as used in tag clouds. Tasks can be considered related if two tasks share the same resources. For example, common files are a shared resource, therefore the files are related. Resources whose IDs match a certain pattern may be considered related resources. For example, two files of the same name but with different suffixes, i.e. abc.txt and abc.xls, may be considered related resources. In a further example, two tasks can be considered to share resources if they access, or open, the same resource or related resources. Tasks can also be computationally related. For example, tasks with a parent/child relationship can be considered related. Tasks can also be considered related if they concern the same subject matter.

If the resources used by the newly initialized task are not related to an open task (no branch, decision block 208), then context switch manager 114 determines whether an event was detected (decision block 210). In one embodiment, an event may be an interruption, such as an action not initiated by the user. For example, a pop-up screen of an instant messenger program or an advertisement on a website may be an interruption. Another example of an interruption is a time out such as a screen saver or automatic hibernate after a period of inactivity. In another embodiment, an event can be user-initiated. For example, before the user leaves the office, the user logs out from or hibernates client computing device 108 so that client computing device 108 is locked while the user is absent. In another embodiment, the closing of a previously existing task group just prior to the initialization of the task in focus may be an event. For example, when the user closes the last task in a task group when the work assignment associated with that task group is complete, just prior to initializing a new task, the closing of the task group may be considered an event. In another embodiment, the user may define certain activities as events. For example, the user may define the email program to be an event such that when the user receives or opens an email, context switch manager 114 detects an event.

If context switch manager 114 does not detect an event (no branch, decision block 210), then context switch manager 114 adds the task in focus to the current task group (step 212). The current task group is the task group in which the previous task in focus belongs. The new task is added to the current task group because of the likelihood that the new task is part of the same work assignment as the previous task in focus due to the succession in which the tasks are opened, i.e. the previous task in focus was opened immediately prior to the initialization of the current task in focus. If context switch manager 114 detects an event (yes branch, decision block 210), then context switch manager 114 generates a new task group (step 206).

Responsive to generating a new task group, context switch manager adds the task in focus to the new task group (step 214).

If, responsive to determining one or more tasks are open (yes branch, decision block 204), and context switch manager 114 determines that the task in focus uses the same or related resources to one or more of the open tasks (yes branch, decision block 208), then context switch manager 114 determines whether the task in focus shares related resources with more than one task group (decision block 216). If the task in focus does share resources with more than one task group (yes branch, decision block 216), then context switch manager 114 merges the task groups (step 218). For example, if the task in focus shares one resource with task group A and a different resource with task group B, then context switch manager 114 merges task group A with task group B. If the user prefers to keep related task groups separate, the user may override the merge performed by context switch manager 114.

Responsive to merging related task groups or determining that the task in focus does not share related resources with more than one task group (no branch, decision block 216), context switch manager 114 adds the task in focus to the related task group (step 220). The related task group may be the current task group, the merged task group, or a previously generated task group.

Responsive to adding the task in focus to the current, a related, or a new task group, context switch manager 114 updates the task group list (step 222). Context switch manager 114 maintains a list of each task in each task group. As a new task is initialized, context switch manager 114 updates the appropriate task group list. A user may reassign a task to a different task group if the user decides context switch manager 114 has assigned a task to an inappropriate task group.

Context switch manager 114 determines if the current task group is related to one or more other task groups (decision block 224). If a member task of the current task group uses the same or related resources of at least one task in another task group, context switch manager 114 determines if the two task groups are related. If context switch manager 114 determines that the current task group is related to one or more other task groups (yes branch, decision block 224), context switch manager 114 merges the related task groups (step 226).

Responsive to merging related task groups or if context switch manager 114 determines there are no related task groups (no branch, decision block 224), context switch manager 114 determines if a new task is initialized (decision block 228). If context switch manager 114 determines that a new task is not initialized (no branch, decision block 228), then context switch manager 114 completes execution and ends. If context switch manager 114 determines that a new task is initialized (yes branch, decision block 228), then context switch manager 114 returns to step 202.

Figure 3:
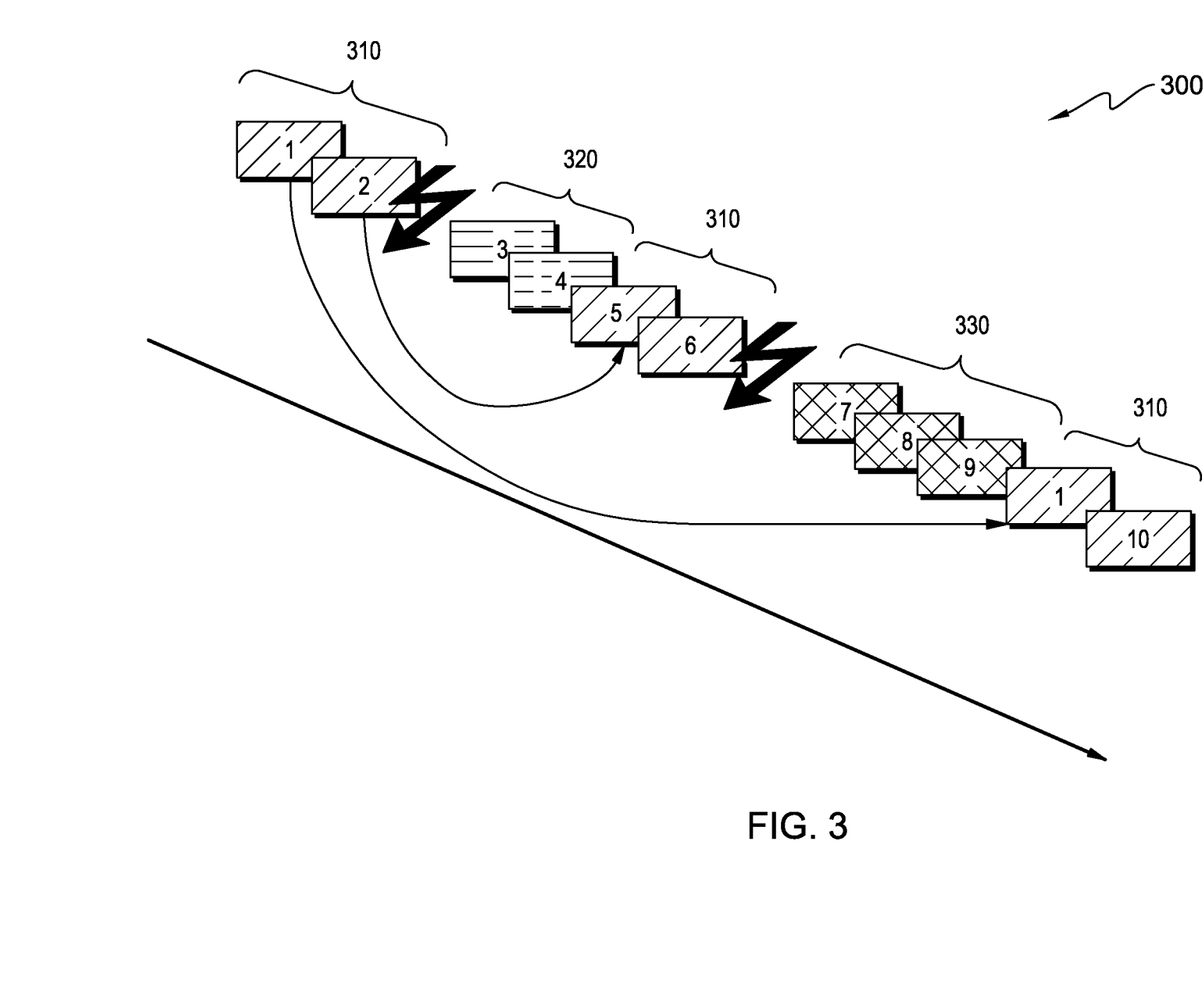
FIG. 3 illustrates an example of the operation of the context switch manager of FIG. 2 inserted on a client computing device within the distributed data processing environment of FIG. 1, in accordance with an embodiment of the present invention.

FIG. 3 illustrates an example of the operation of context switch manager 114 inserted on client computing device 108 within data processing environment 100 of FIG. 1, in accordance with an embodiment of the present invention.

In example 300, each rectangle represents a unique task. Similar patterns inside the rectangle indicate tasks within the same task group. Task groups are also shown within numbered brackets. The jagged arrows indicate an event or an interruption. The long, arched arrows indicate the continuation of a task or task group. The long, straight arrow represents the passing of time. The progression of the tasks in example 300 is presented with respect to the steps described earlier with respect to FIG. 2.

A user begins task 1, making task 1 the task in focus. Task 1 may be a word processing document in a directory named "Travel". Context switch manager 114 generates a new task group, task group 310, per step 206, because there are no other open tasks, per decision block 204. The user then begins task 2, making task 2 the task in focus. Task 2 is a second document from the directory named "Travel". Task 2 is added to task group 310 with task 1, per step 220, because task 1 and task 2 share a related resource, i.e. files in the same directory, per decision block 208. After task 2 opens, an interruption occurs. The interruption may be the receipt of an email or an instant message.

Following the interruption, the user begins task 3, making task 3 the task in focus. Task 3 may be a tab in a web browser. Context switch manager 114 generates a new task group, task group 320, per step 206, because task 3 does not share resources with the tasks in task group 310, per decision block 208, and the initialization of task 3 occurred after an event, per decision block 210.

The user begins task 4, making task 4 the task in focus. Task 4 may be a second tab in the web browser. Context switch manager 114 adds task 4 to task group 320 with task 3, per step 212, because task 3 and task 4 do not share a related resource, per decision block 208, and task 4 did not begin following an event, per decision block 210.

The user begins task 5, making task 5 the task in focus. Task 5 may be a spreadsheet in the directory named "Travel". Context switch manager 114 adds task 5 to task group 310, per step 220, because task 5 shares a related resource with tasks 1 and 2, i.e. files in the same directory, per decision block 208. The user then begins task 6, making task 6 the task in focus. Task 6 is a presentation document from the directory named "Travel". Context switch manager adds Task 6 to task group 310 with tasks 1, 2, and 5, per step 220, because tasks 1, 2, 5, and 6 share a related resource, i.e. files in the same directory, per decision block 208. After task 6 opens, an event occurs. The event may be the user locking client computing device 108 to take a break.

Following the event, the user begins task 7, making task 7 the task in focus. Task 7 may be a Portable Document Format (PDF) file in a directory named "Salary". Context switch manager 114 generates a new task group, task group 330, per step 206, because task 7 does not share resources with the tasks in task group 310 or task group 320, per decision block 208, and the initialization of task 7 occurred after an event, per decision block 210.

The user begins task 8, followed by task 9. Both task 8 and task 9 are PDF files in the directory named "Salary". Context switch manager 114 adds tasks 8 and 9 to task group 330, per step 220, because tasks 7, 8, and 9 share a related resource, i.e. files in the same directory, per decision block 208.

The user returns to task 1 in task group 310. The user clicks a link in the task 1 word processing document that opens a new browser tab. The new browser tab is task 10, and task 10 is now the task in focus. Context switch manager 114 adds task 10 to task group 310, per step 212, because the new task is added to the current task group when the two tasks do not share a resource, per decision block 208, and no event was detected, per decision block 210.

Figure 4:
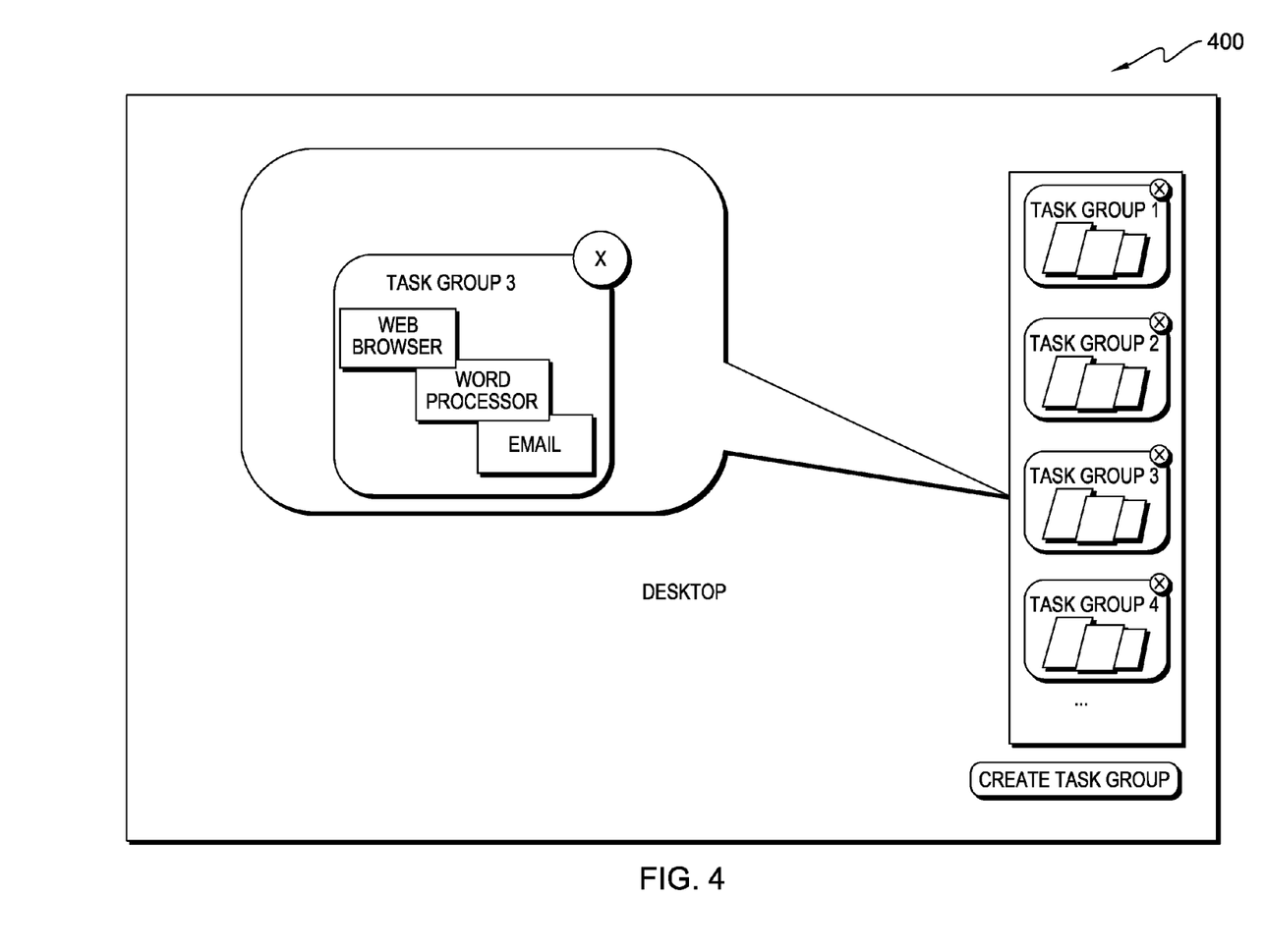
FIG. 4 illustrates an example of a graphical user interface of the context switch manager of FIG. 2 displayed, via a user interface, on a client computing device within the distributed data processing environment of FIG. 1, in accordance with an embodiment of the present invention.

FIG. 4 illustrates an example of context switch manager 114 displayed, via user interface 110, on client computing device 108 within data processing environment 100 of FIG. 1, in accordance with an embodiment of the present invention.

In the embodiment depicted in example 400, context switch manager 114 is displayed, via user interface 110, as a "tray" on the right side of a screen associated with client computing device 108. The tray automatically collects all applications and processes, and current state. Within the tray, all tasks, i.e. open applications and processes, are displayed by windows or tabs within windows. Each task may be displayed as a minimized screen shot (thumbnail) or an icon, with a name and a last modified time stamp, to allow for easy recognition by the user. Tasks are grouped, with each group representing a work assignment. A user may move a task from one task group to another by dragging and dropping the task with a mouse. One or more applications or tasks may be pre-configured to belong to the same task group. Within a task group, task thumbnails may be stacked according to the time they were opened and/or last modified and saved with the full state. Task groups 1, 2, 3, and 4 are shown in the tray. An enlarged view of task group 3 is shown in the center of the desktop. This represents the view a user sees when the user hovers a mouse over the task group in the tray.

A user may close a task group by clicking on the "close" icon, shown as an "X" in a circle in example 400. When the user clicks the close icon, context switch manager 114 closes the tasks in the task group, saving the current state for each task. A user may manually create a task group by clicking on the "create task group" button, shown below the tray. Context switch manager 114 prompts the user to either open the preferred tasks or to specify which tasks to open.

Context switch manager 114 may alert the user if context switch manager 114 detects a period of inactivity that exceeds a pre-defined threshold for a particular task or task group. The user may define as well as change the threshold per the user's preference. Context switch manager 114 may alert the user visually. For example, context switch manager 114 may cause the task group icon in the tray to flash. Context switch manager 114 may also alert the user audibly. For example, context switch manager 114 may cause client computing device 108 to emit a sound to get the attention of the user. The user may customize the type, time, and length of the alert.

Figure 5:
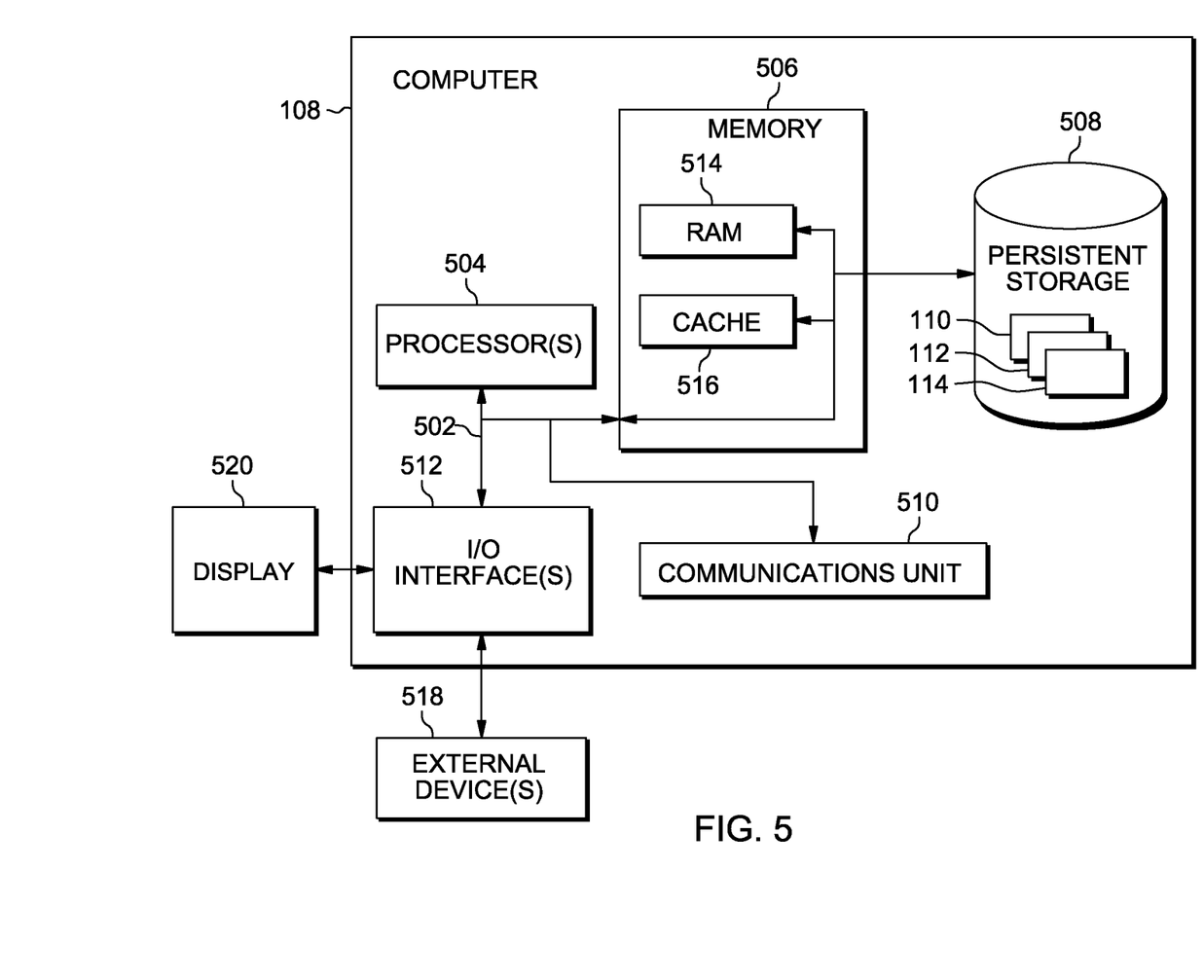
FIG. 5 depicts a block diagram of components of the client computing device executing the context switch manager, in accordance with an embodiment of the present invention.

FIG. 5 depicts a block diagram of components of client computing device 108 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Client computing device 108 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications, and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

User interface 110, application(s) 112, and context switch manager 114 are stored in persistent storage 508 for execution by one or more of the respective computer processor(s) 504 via one or more memories of memory 506. In this embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of server computer 104. In these examples, communications unit 510 includes one or more network interface cards. Communications unit 510 may provide communications through the use of either or both physical and wireless communications links. User interface 110, application(s) 112, and context switch manager 114 may be downloaded to persistent storage 508 through communications unit 510.

I/O interface(s) 512 allows for input and output of data with other devices that may be connected to client computing device 108. For example, I/O interface(s) 512 may provide a connection to external device(s) 518 such as a keyboard, a keypad, a touch screen, and/or some other suitable input device. External device(s) 518 can also include portable computer readable storage media such as, for example, thumb drives, portable optical or magnetic disks, and memory cards. Software and data used to practice embodiments of the present invention, e.g., user interface 110, application(s) 112, and context switch manager 114, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for grouping related tasks, the computer program product comprising:
    one or more computer readable storage media and program instructions stored on the one or more computer readable storage media, the program instructions comprising:
    program instructions to receive a first task initialization by a first user, wherein a task is at least one of: an application, a tab within a window, or a process that has a user interface, and wherein a task represents a work unit that belongs to a work assignment of the first user;
    program instructions to determine whether one or more additional tasks contained in one or more task groups are in use by the first user;
    responsive to determining one or more additional tasks contained in one or more task groups are in use, program instructions to determine whether the first task is related to at least one task of the one or more additional tasks, wherein the first task and the at least one task are related by sharing one or more resources; and
    responsive to determining the first task is related to at least one task of the one or more additional tasks, program instructions to add the first task to the task group containing the at least one related task of the one or more additional tasks.

2. The computer program product of claim 1, further comprising:
    responsive to determining the first task is not related to at least one task of the one or more additional tasks, program instructions to determine whether an event is detected;
    responsive to determining an event is detected, program instructions to generate a new task group; and
    program instructions to add the first task to the new task group.

3. The computer program product of claim 2, further comprising, responsive to determining an event is not detected, program instructions to add the first task to a task group that contains a second task, wherein the second task is in focus immediately prior to the first task initialization.

4. The computer program product of claim 1, further comprising:
    responsive to determining one or more additional tasks contained in one or more task groups are not in use, program instructions to generate a new task group; and
    program instructions to add the first task to the new task group.

5. The computer program product of claim 1, further comprising:
    responsive to determining the first task is related to at least one of the one or more additional tasks, program instructions to determine whether the first task is related to at least one task in a first task group and at least one task in a second task group; and
    responsive to determining the first task is related to at least one task in a first task group and at least one task in a second task group, program instructions to merge the first and the second task groups into a merged task group, wherein the merged task group includes at least the first task and the first and the second task groups.

6. The computer program product of claim 1, further comprising:
    program instructions to determine at least one of the one or more tasks of the one or more task groups are inactive for a pre-defined threshold of time; and
    program instructions to alert the first user of the inactivity.

7. A computer system for grouping related tasks, the computer system comprising:
    one or more computer processors;
    one or more computer readable storage media;
    program instructions stored on the computer readable storage media for execution by at least one of the one or more processors, the program instructions comprising:
    program instructions to receive a first task initialization by a first user, wherein a task is at least one of: an application, a tab within a window, or a process that has a user interface, and wherein a task represents a work unit that belongs to a work assignment of the first user;
    program instructions to determine whether one or more additional tasks contained in one or more task groups are in use by the first user;
    responsive to determining one or more additional tasks contained in one or more task groups are in use, program instructions to determine whether the first task is related to at least one task of the one or more additional tasks, wherein the first task and the at least one task are related by sharing one or more resources; and
    responsive to determining the first task is related to at least one task of the one or more additional tasks, program instructions to add the first task to the task group containing the at least one related task of the one or more additional tasks.

8. The computer system of claim 7, further comprising:
    responsive to determining the first task is not related to at least one task of the one or more additional tasks, program instructions to determine whether an event is detected;
    responsive to determining an event is detected, program instructions to generate a new task group; and
    program instructions to add the first task to the new task group.

9. The computer system of claim 8, further comprising, responsive to determining an event is not detected, program instructions to add the first task to a task group that contains a second task, wherein the second task is in focus immediately prior to the first task initialization.

10. The computer system of claim 7, further comprising:
    responsive to determining one or more additional tasks contained in one or more task groups are not in use, program instructions to generate a new task group; and
    program instructions to add the first task to the new task group.

11. The computer system of claim 7, further comprising:
    responsive to determining the first task is related to at least one of the one or more additional tasks, program instructions to determine whether the first task is related to at least one task in a first task group and at least one task in a second task group; and
    responsive to determining the first task is related to at least one task in a first task group and at least one task in a second task group, program instructions to merge the first and the second task groups into a merged task group, wherein the merged task group includes at least the first task and the first and the second task groups.

* * * * *